United States Patent
DeLaet (10) Patent No.: US 9,669,297 B1
(45) Date of Patent: Jun. 6, 2017

(54) USING BIOMETRICS TO ALTER GAME CONTENT

(71) Applicant: KABAM, INC., San Francisco, CA (US)

(72) Inventor: Michael C. DeLaet, Foster City, CA (US)

(73) Assignee: Aftershock Services, Inc., San Francisco, CA (US)

( * ) Notice: Subject to any disclaimer, the term of this patent is extended or adjusted under 35 U.S.C. 154(b) by 289 days.

(21) Appl. No.: 14/030,994

(22) Filed: Sep. 18, 2013

(51) Int. Cl.
*A63F 13/00* (2014.01)
*A63F 13/30* (2014.01)

(52) U.S. Cl.
CPC ................... *A63F 13/12* (2013.01)

(58) Field of Classification Search
CPC ............... A63F 13/10; A63F 13/355
USPC ................ 463/1–6, 46, 47, 40–42
See application file for complete search history.

(56) References Cited

U.S. PATENT DOCUMENTS

| | | | |
|---|---|---|---|
| 2004/0229685 A1* | 11/2004 | Smith ..................... | A63F 13/10 463/29 |
| 2006/0224046 A1* | 10/2006 | Ramadas et al. ............ | 600/300 |
| 2008/0033826 A1 | 2/2008 | Maislos et al. ................. | 705/14 |
| 2008/0318673 A1* | 12/2008 | Rofougaran .................... | 463/29 |
| 2009/0270170 A1* | 10/2009 | Patton ..................... | A63F 13/10 463/36 |
| 2010/0332842 A1 | 12/2010 | Kalaboukis et al. ......... | 713/186 |
| 2011/0260830 A1* | 10/2011 | Weising .................. | G06F 3/015 340/5.52 |
| 2012/0086630 A1* | 4/2012 | Zhu ....................... | A63F 13/355 3/355 |
| 2012/0158504 A1 | 6/2012 | Kumar et al. ............. | 705/14.53 |
| 2013/0225261 A1* | 8/2013 | Cruz-Hernandez ............ | 463/23 |

OTHER PUBLICATIONS

Biofeedback in Gameplay: How Valve Measures Physiology to Enhance Gaming Experience Mike Ambinder, PhD Mar. 3, 2011.*

* cited by examiner

*Primary Examiner* — David L Lewis
*Assistant Examiner* — Ross Williams
(74) *Attorney, Agent, or Firm* — Sheppard Mullin Richter & Hampton LLP (57) ABSTRACT

An online gaming system for adjusting game content presented to users in an online game. The system may adjust content based on mood profiles determined for the individual users. The system may comprise one or more processors configured to execute computer program modules. The system may include a game module configured to execute an instance of an online game and to implement the instance of the online game to facilitate participation of users in the online game. The system may include a biometrics module configured to obtain biometric characteristic information from user client computing platforms. The system may include a mood module configured to determine mood profiles for the users based on the biometric characteristic information. The system may include a content adjustment module configured to identify and effectuation presentation of content in the online game based on the mood profiles.

24 Claims, 3 Drawing Sheets

USING BIOMETRICS TO ALTER GAME CONTENT

FIELD OF THE DISCLOSURE

This disclosure relates to using user biometric characteristic information to adjust game content presented to the users within and online game.

BACKGROUND

Users may access virtual environments via client computing platforms. Virtual environments may include online games. A user's emotional state (e.g., mood) may affect the user's gameplay experience in the online game.

Biometric characteristic information may be information about the users which may correlate with an emotional state of the user. Biometric characteristic information may refer to physiological and/or behavioral characteristics of an individual. Biometric characteristic information may include information such as the positioning and/or orientation of a user's facial features, an amount of perspiration, pulse rate, blood oxygen saturation, and/or other information. Biometric scanning components and/or devices may be employed to obtain biometric characteristic information and/or other information about users.

SUMMARY

One aspect of the disclosure relates to an online gaming system configured to adjust content presented to users participating in an online game via client computing platforms. The system may be configured such that biometric characteristic information about the users may be obtained at the client computing platforms for consideration when identifying content to present to the users. The system may comprise one or more processors configured to execute computer program modules. The computer program modules may comprise a game module, a biometrics module, a mood module, a content adjustment module, and/or other modules.

The game module may be configured to execute an instance of an online game, and to implement the instance of the online game to facilitate participation of users in the online game via client computing platforms. The users may include a first user participating in the online game via a first client computing platform.

The biometrics module may be configured to obtain biometric characteristic information from the user client computing platforms. Such biometric characteristic information may include first biometric characteristic information for the first user obtained from the first client computing platform.

The mood module may be configured to determine, from the biometric characteristic information obtained by the biometrics module, mood profiles for the users. For example, responsive to obtaining the first biometric characteristic information, the mood module may determine a first mood profile for the first user.

The content adjustment module may be configured to identify game content of the online game to be presented to the users based on the user mood profiles and effectuate presentation of the identified game content of the online game for the appropriate users of the online game. Such identifications may include identifying a first set of game content based on the first mood profile for the first user. Presentation of the first set of game content to the first user may be effectuated.

Another aspect of the disclosure relates to a method for dynamically adjusting game content in an online game. The method may be implemented in a computer system that includes one or more physical processors and storage media storing machine-readable instructions. The method may comprise the operations of: effectuating an instance of an online game, and implementing the instance of the online game to facilitate participation of users in the online game via client computing platforms, the users including a first user participating in the online game via a first client computing platform; obtaining biometric characteristic information from the user client computing platforms, such biometric characteristic information including first biometric characteristic information for the first user obtained from the first client computing platform; determining, from the biometric characteristic information, mood profiles for the users such that, responsive to obtaining the first biometric characteristic information, determining a first mood profile for the first user; identifying game content of the online game to be presented to the users based on the user mood profiles, including identifying a first set of game content based on the first mood profile for the first user; effectuating presentation of the identified game content of the online game for the appropriate users of the online game such that presentation of the first set of game content to the first user is effectuated; and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
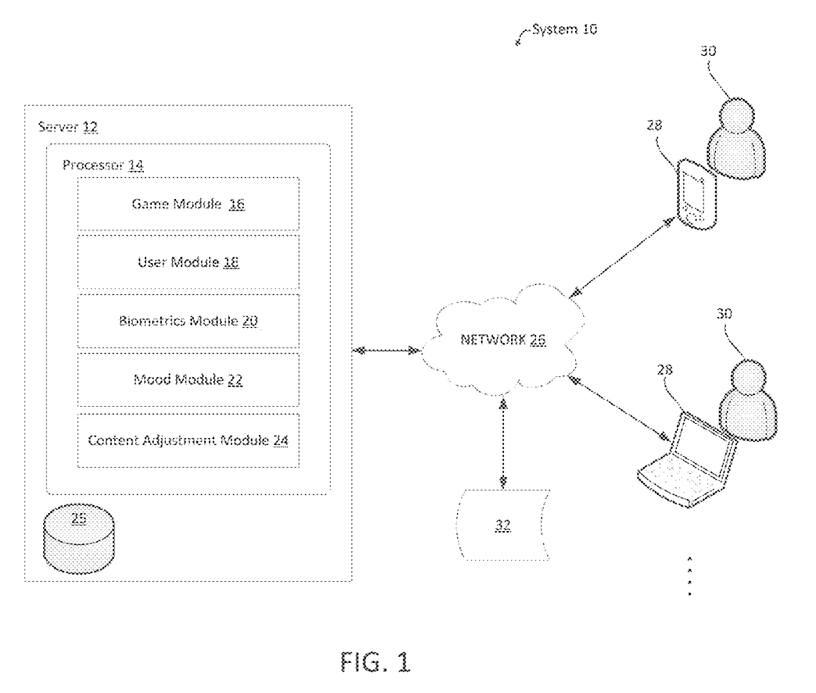
FIG. 1 illustrates a system configured to obtain biometric characteristic information from user client computing platforms to adjust game content presented to users of an online game.

FIG. 1 illustrates a system 10 configured to obtain biometric characteristic information about users participating in a virtual environment, and adjust content presented to the individual users in the virtual environment. The virtual environment may include, for example, an online game. Virtual environment content may include, for example, game content. The users may participate in the virtual environment via client computing platforms 28. Briefly, biometric characteristic information may be obtained from the client computing platforms 28 and used to determine mood profiles of the users during user participation in the online game. Mood profiles may characterize the transient emotional state of the users during participating in the online game. Mood profiles are described in more detail herein. Through a determination of the emotional state of the user, game content may be identified and selectively presented to the users in accordance with the user's emotional state to enhance the user's gameplay experience in the online game.

Client computing platforms 28 may include one or more of a computing device, laptop, desktop, smart phone, smart TV, tablet, gaming console, and/or other device suitable for the intended purposes of the invention described herein. Client computing platforms 28 may be devices which are capable of network communications. Client computing platforms 28 may be Internet capable devices.

The client computing platforms 28 may employ biometrics scanning components suitable for obtaining biometric characteristic information about the users at the client computing platforms 28. One or more suitable biometrics scanning components may be engaged and/or otherwise integrated to the client computing platforms 28 as an OEM device, and/or may communicate with the client computing platforms 28 as peripheral devices. Biometrics scanning components may include one or more of a camera, retinal scanner, pulse oximeter, fingerprint scanner, moisture sensor, gyroscope, accelerometer, compass, global positioning system (GPS), assisted GPS (AGPS), and/or other suitable components configured to carry out the intended features of the invention described herein. It is to be noted that reference to client computing platforms 28 may encompass reference to one or both of client computing platforms 28 having biometrics scanning components being integrally engaged thereto and/or having biometrics scanning components employed as peripheral devices.

Biometric characteristic information may be information used to determine mood profiles for the individual users. Biometric characteristic information may include one or more of facial feature information, retina information, blood oxygen saturation information, pulse rate information, perspiration information, and/or other information about the users which is obtained from the client computing platforms 28. Biometric characteristic information may be obtained by one or more of the biometrics scanning components described above, and/or by other techniques.

Facial feature information may include information relating to one or more of the positioning and/or orientation of the features of the users face. Positioning and/or orientation of facial feature may consider one or more of the eyebrows, nose, mouth, eyes, ears, cheeks, and/or other feature(s). In some embodiments, the client computing platforms 28 may include a camera and/or similar component. Obtaining biometric characteristic information may comprise obtaining a facial scan of the user via an image and/or images captured by the camera and/or similar component. The facial scan and/or images may provide the facial feature information about the user.

Retina information may include one or more the size of the retinal blood vessels and/or other information. The size of the retinal blood vessel may relate to the blood supply through the vessel. Briefly, however described in more detail herein, the blood supply through the blood vessel may correlate with the emotional state of the user. In some embodiments, the client computing platforms 28 may include a retinal scanner and/or similar component. Obtaining biometric characteristic information may comprise obtaining a retinal scan of the user via a scan performed by the retinal scanner and/or similar component. The retinal scan may provide the retina information about the user.

Blood oxygen saturation information may include one or more a measurement of the oxygen saturation in the user's blood and/or other information. Briefly, however described in more detail herein, blood oxygen saturation may correlate with an emotional state of the user. In some embodiments, the client computing platforms 28 may include a pulse oximeter and/or similar component. Obtaining biometric characteristic information may comprise obtaining a blood oxygen saturation measurement via monitoring performed by the pulse oximeter and/or similar component employed by the users at the client computing platforms 28. The blood oxygen saturation measurement may provide the blood oxygen saturation information about the user.

Pulse rate information may include one or more a rate measurement of the users pulse and/or other information. Briefly, however described in more detail herein, the users pulse rate may correlate with an emotional state of the user. In some embodiments, the client computing platforms 28 may include a pulse oximeter and/or similar component. Obtaining biometric characteristic information may comprise obtaining a pulse rate measurement via monitoring performed by the pulse oximeter and/or similar component employed by the users at the client computing platforms 28. The pulse rate measurement may provide the pulse rate information about the user.

Perspiration information may include one or more a measurement of the amount of moisture present on the user's skin (e.g., an amount of perspiration). Briefly, however described in more detail herein, the amount of perspiration may correlate with an emotional state of the user. In some embodiments, the client computing platforms 28 may include a moisture sensor and/or similar component. Obtaining biometric characteristic information may comprise obtaining a skin moisture measurement via sensing performed by the moisture sensor and/or similar component employed by the users at the client computing platforms 28. The moisture measurement may provide the perspiration information about the user.

The descriptions provided herein relating to the biometric characteristic information and/or components configured to obtain biometric characteristic information from users at client computing platforms 28 are provided merely as illustrative examples and are not intended to be limiting. As such it is to be understood that the manner in which one or more components and/or techniques are employed to obtain biometric characteristic information at client computing platforms 28 may be accomplished in other ways and/or by other considerations.

In some implementations, mood profiles may be determined for the individual users based on the biometric characteristic information obtained from the client computing platforms 28. Mood profiles may characterize the emotional state of the user during user participation in the online game. In some implementations the emotional state may also be referred to as the mood of the user. Moods and/or emotional states may include, for example, one or more of happy, sad, indifferent, angry, frustrated, annoyed, confused, excited, and/or other considerations. The examples provided herein are for illustrative purposes only and are not intended to be limiting. As such it is to be understood that user mood profiles, moods, and/or emotional states may be determined and/or considered in other ways. The determination of mood profiles characterizing the emotional state of the users from the biometric characteristic information is described in more detail herein.

Briefly, the emotional state of the user may affect the user's gameplay experience. As such, through a determination of a mood profile of the users, game content can be selectively identified and presented to the user in accordance with the mood profile to enhance the user's gameplay experience in the online game.

In FIG. 1, providing the virtual environment may include hosting the virtual environment over a network 26, such as the Internet. A host server may include one or more processors configured to execute one or more computer modules for implementing an instance of an online game and to facilitate the participation of one or more users in the online game. The host server may be a game server 12. The server 12 may include processor(s) 14.

The computer program modules may include one or more of a game module 16, a user module 18, a biometrics module 20, a mood module 22, a content adjustment module 24, and/or other modules. The server 12 may be configured to communicate with one or more client computing platforms 28, according to client/server architecture. The client computing platforms 28 can include, for example, a cellular telephone, a smartphone, a laptop, a tablet computer, a desktop computer, a television set-top box, smart TV, a gaming console, and/or other device as described herein and/or other considerations. The users may access system 10 and/or the virtual environment via client computing platforms 28.

The game module 16 may be configured to implement an instance of the virtual environment executed by the computer modules to determine state of the virtual environment. The state may then be communicated (e.g., via streaming visual data, via object/position data, and/or other state information) from server 12 to client computing platforms 28 for presentation to users. The state determined and transmitted to a given client computing platform 28 may correspond to a view for a user character being controlled by a user via input devices (e.g., a controller) at the given client computing platform 28. The state determined and presented to a given client computing platform 28 may correspond to a location in the virtual environment (e.g., location in the game). The view described by the state for the given client computing platform 28 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

An instance of the virtual environment may comprise a simulated environment that is accessible by users via clients (e.g., client computing platforms 28) that present the views of the virtual environment to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein). An instance executed by the computer modules may be synchronous, asynchronous, and/or semi-synchronous.

The above description of the manner in which state of the virtual environment is determined by game module 16 is not intended to be limiting. The game module 16 may be configured to express the virtual environment in a more limited, or more rich, manner. For example, views determined for the virtual environment representing the state of the instance of the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 16, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual items and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through client computing platforms 28. The users may interact with each other through communications exchanged within the virtual environment. Such communications may include one or more of textual chat, instant messages, private messages, voice communications, and/or other communications. Communications may be received and entered by the users via their respective client computing platforms 28. Communications may be routed to and from the appropriate users through server 12 (e.g., through game module 16) and/or through communications which are external to the system 10 (e.g., text messaging services associated with the client computing platforms 28).

The user module 18 may be configured to access and/or manage one or more user profiles and/or user information associated with users of the system 10. The one or more user profiles and/or user information may include information stored by server 12, one or more of the client computing platforms 28, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The biometrics module 20 may be configured to obtain biometric characteristic information about the users from the user client computing platforms 28. The biometrics module 20 may obtain biometric characteristic information in a variety of ways. In some implementations, the biometrics module 20 may periodically prompt the user (e.g., via a pop up window, instant message, etc.) to employ the one or more biometrics scanning components at the client computing platforms 28. For example, periodically (e.g., at the start of gameplay; every 10 minute, 20 minutes, 30 minutes, 1 hour; after completion of a quest; before starting a task; randomly, and/or other consideration), the user may be prompted to take a picture of their face using a camera (or other component) at the client computing platform 28 such that the biometrics module 20 may obtain facial feature information about the user (e.g., via the picture taken), and/or prompt the user to perform other actions related to employing one or more biometrics scanning components to obtain biometric characteristic information as described herein.

In some implementations, the biometrics module 20 may be configured such that obtaining biometric characteristic information includes automatically receiving biometric characteristic information from the client computing platforms 28. For example the biometrics module 20 may be configured to effectuate an automatic biometrics scan using of one or more biometrics scanning components at the client computing platforms 28. This may include, for example, at periodic, random, and/or predetermined intervals, the biometrics module 20 may be configured to effectuate an automatic retinal scan (and/or other biometrics scan(s)) of the individual users via a retinal scanner (and/or other component(s)) employed at the client computing platforms 28.

The descriptions provided herein relating how biometric characteristic information is obtained from the users at client computing platforms 28 are provided merely as illustrative examples and are not intended to be limiting. As such it is to be understood that the manner in which the biometric characteristic information is obtained from client computing platforms 28 may be carried out in other ways and/or by other considerations.

Figure 2:
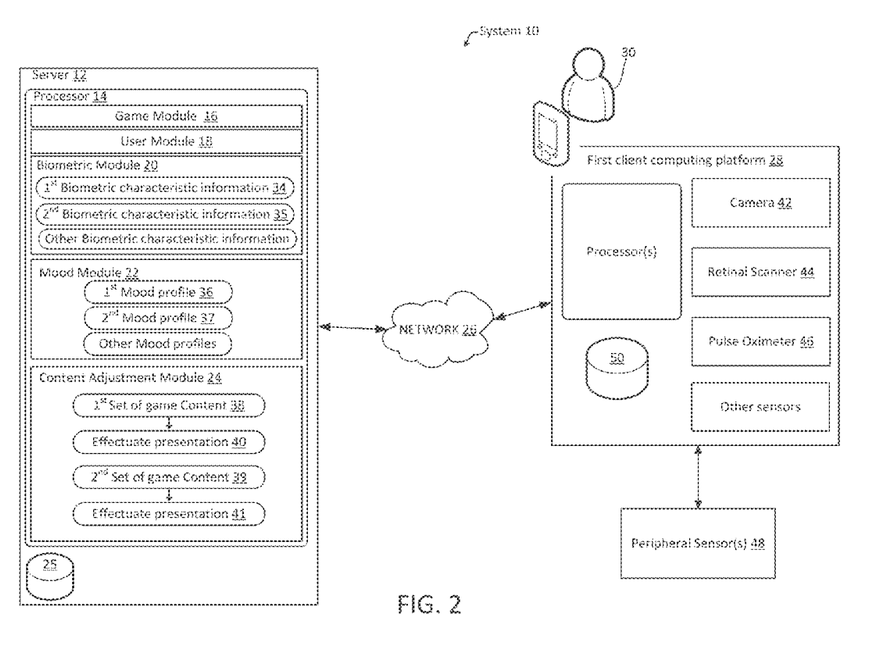
FIG. 2 illustrates a particular embodiment of the system illustrated in FIG. 1.

As an illustrative example of a particular embodiment of the system 10, in FIG. 2, the biometrics module 20 may be configured such that obtaining biometric characteristic information includes obtaining first biometric characteristic information 34. The first biometric characteristic information 34 may be information about a first user 30 at a first client computing platform 28. The first client computing platform 28 may be employed by the first user 30 to participate in the online game. The first client computing platform 28 may include one or more biometrics scanning components as described herein, and/or other components, such as a camera 42, retinal scanner 44, pulse oximeter 46, peripheral sensors devices 48, and/or other sensors and/or components. Biometric characteristic information may be obtained by any of the techniques described herein, and/or by other techniques.

Returning to FIG. 1, the mood module 22 may be configured to determine, from the biometric characteristic information obtained by the biometrics module 20, mood profiles for the users. The determination of mood profiles from the biometric characteristic information may be accomplished a variety of ways. In some implementations, the biometric characteristic information may correlate with a transient emotional state of the user. The emotional state of the user may indicate the user's current sentiment toward participation and/or engagement in the online game. The mood profiles may be determined to provide such an indication of the user's current sentiment toward participation in the online game, and/or a characterization of the user's emotional state correlated from the biometric characteristic information.

Biometric characteristic information may correlate with a transient emotional state of the user. Emotional states may be, for example, one or more of happy, sad, indifferent, angry, frustrated, annoyed, confused, excited, and/or other considerations. Correlations may be accomplished in a variety of ways. Correlations of emotional states and biometric characteristic information may consider common correlations. For example, it may be commonly known that when a person is smiling (e.g., their facial features showing their mouth turned up, eyes open, etc.), this can generally be correlated with the person being 'happy' or in a good mood. As another example, when a person is generally angry, their face may become flush, their heart rate may speed up, their breathing may increase, their teeth clench, etc. Although such common correlations may be considered within the scope of this invention, other correlations and/or correlation techniques may be employed. As such, the following descriptions of correlating biometric characteristic information to one or more emotional states are provided merely for illustrative purposes and are not intended to be limiting.

As a first example, biometric characteristic information may include facial feature information of the positioning and/or orientation of the facial features of an individual, which may indicate an emotional state. A facial scan provided by a camera component of the client computing platforms 28 may indicate that a user's mouth is turned down (e.g., frown) and that their eyes are slightly closed, which may correlate generally with the user being in a 'sad' emotional state.

As a further example, biometric characteristic information may include facial feature information as well as blood oxygen saturation information obtained from suitable components employed at the client computing platforms 28. The facial feature information may include information indicating the user's mouth is turned upward (e.g., smiling), their eyes are open wide, and their eyebrows are substantially raised, which may correlate generally with the user being in a 'happy' emotional state. The blood oxygen saturation information may include information such as high levels of oxygen in the user's blood (e.g., as a result of the user breathing heavily), which may correlate generally with the user being in an 'excited' emotional state. As such, in this example, the above biometric characteristic information may correlate with a 'happy and excited' emotional state of the user.

As yet another example, biometric characteristic information may include perspiration information as well as pulse rate information obtained from suitable components employed at the client computing platforms 28. The perspiration information may include information indicating that the user's skin (e.g., palms of their hands) are moistening (e.g., the users is sweating), which may correlate generally with the user being in a 'nervous' emotional state (e.g., human beings tend to sweat when nervous). The pulse rate information may include information such as a high pulse rate which may correlate generally with the user being in an 'excited' emotional state. As such, in this example, the above biometric characteristic information may correlate with a 'nervous and excited' emotional state of the user.

As still yet another example, biometric characteristic information may include facial feature information as well as retina information obtained from suitable components employed at the client computing platforms 28. The facial feature information may include information indicating that the user's mouth is tightly closed, and their eyebrows positioned in the shape of a 'V', which may correlate generally with the user being in an 'angry' emotional state. The retina information may include information such as having enlarged retinal blood vessels indicating increase blood flow there through which may correlate generally with the user being in an 'angry' emotional state (e.g., their face is flushed). As such, in this example, the above biometric characteristic information may correlate with a 'very angry' emotional state of the user.

The descriptions herein relating to correlations of biometric characteristic information to emotional states are provided merely as illustrative examples and are not intended to be limiting. As such it is to be understood that the manner in which one or more correlations are performed may be accomplished in other ways and/or by other considerations. For example, information captured from a GPS component may indicate that the user and/or the client computing platform 28 held by the user is moving and/or shaking rapidly, which may correlate with the user being frustrated and/or angry (e.g., the users is shaking their client computing platform 28 in anger and/or frustration).

The emotional state of the user may provide an indication of the user's current sentiment toward participation and/or engagement in the online game. The user's current sentiment toward participation may indicate whether or not the user is inclined to continue playing the online game at an instance in time when the emotional state is determined, and/or over a period of time which the given emotional state is maintained (e.g., until a different emotional state is determined). Briefly, user participation may refer to continuing play in the online, participating in certain content presented to them, engaging themselves further into the online game, participating with other players in the online game, and/or other considerations of participation within the online game. For example, a user may be in a 'happy' emotional state as correlated from obtained biometric characteristic information. The user may be 'happy' for many reasons, for example, the user is scoring a lot of points in the online game, the user is winning many tournaments occurring in the online game, and/or the user may simply be in a good mood. When the user is 'happy', the user may be more inclined to participate in the online game. When a user is 'sad', the user may be less inclined to participate in the online game (e.g., because they continually lose the game, are not scoring many points, and/or other reasons). When a user is 'indifferent', the user may or may not be inclined to participate in the online game. Sentiment toward participation in the online game may be considered in other ways.

Mood profiles may be qualitative and/or quantitative descriptions. Mood profiles may be a qualitative description of the emotional state of the user. Mood profiles may change over time as the emotional state of the user changes over time. For example, a mood profile for a given user may be "Happy", "Sad", "Indifferent", "Excited", "Happy and excited", "Angry and Frustrated", and/or other a description of one or more other emotional states correlated from the biometric characteristic information described herein. In some implementations, mood profiles may be a qualitative description of the user's sentiment toward participation in the game (e.g., whether or not the user is inclined to continue playing the online game). For example, a mood profile for a given user may be "Likely to continue play", "Not likely to continue play", "Indifferent", and/or other description(s).

Mood profiles may be quantitative descriptions, for example a "mood score". In some implementations, mood profiles may comprise a numerical score. The numerical score may be based on a rating scale. A rating scale may be a scale which rates the emotional state of the user (e.g., angry to happy, frustrated to calm, indifferent to excited, etc.), the sentiment toward participation in the online game, and/or other rating. A rating scale may comprise whole digit numbers from 0 to 10. In some implementations, the rating scale may score the users sentiment toward participation wherein 0 indicates a sentiment of 'Not likely to continue play', 10 indicates 'Very likely to continue play', 5 indicates 'Indifferent', and numbers in between representing various degrees of user sentiment toward participation in the online game. For example, obtained biometric characteristic information may correlate with a "happy and frustrated" emotional state (e.g., as a result of the user generally wining in the online however may be stuck on a particular level), which may correspond with a mood profile score of 7 (e.g., the user is generally inclined to continue playing the game however, if they continue to get stuck on the level, they may stop playing). The numbering of the 'mood score' and/or the rating scale described herein is purely illustrative. The various scales may be enumerated in other ways, and/or may include more or less values.

In some implementations, the mood module 22 may be configured to, responsive to reception of further biometric characteristic information by the biometrics module 20, determine additional mood profiles of the users indicating a change in the transient emotional state of the users. For example, the biometrics module 20 may be configured to periodically obtain biometric characteristic information about the users at the client computing platforms 28, such as a first instance in time and a second instance in time. The biometric characteristic information obtained at the first instance in time may correlate with a particular mood profile, for example, "Angry" (e.g., a qualitative description of the transient emotional state of the user). The biometric characteristic information obtained at the second instance in time may correlate with a different particular mood profile, for example, "Happy". Thus a change in the transient emotional state (and subsequently the mood profile) of the user may be determined (e.g., from Angry to Happy over the period in time between the two instances).

In some implementations, the mood module 22 may be configured to maintain a database of the correlations of biometric characteristic information to mood profiles for the users once the correlation has been determined by one or more of the techniques described herein. At a first instance of determining mood profiles, the mood module 22 may obtain particular biometric characteristic information, correlate a particular emotional state, and determine a mood profile. The correlation between the given biometric characteristic information and mood profile may be maintained in a database such that in subsequent occurrences of obtaining the similar or same biometric characteristic information, an automatic correlation to a mood profile may be made (e.g., without having to determine an emotional state and/or sentiment as described above).

In some implementations, the mood module 22 may be configured such that maintaining correlations of biometric characteristic information to mood profiles comprises receiving user input of the correlations of biometric characteristic information to mood profiles. Users may be prompted to distinctly input correlations and/or rules for correlating biometric characteristic information to mood profiles. Upon initiation of the online game (and/or initiation of a task, tournament, and/or other gameplay occurrence) the users may be presented with one or more user interfaces wherein the user can set correlations and/or correlation rules. A user interface may include check boxes, drop down menus, and/or other interface wherein the user can, for example, indicate distinct mood profiles correlations for given biometric characteristic information. As an example of setting correlation rules, a user may input a resting pulse rate, input a threshold pulse rate which is higher than the resting pulse rate, and indicate that if the biometric characteristic information includes pulse rate information indicating a pulse rate at or above the threshold, then the mood module 22 should automatically determine a mood profile of "Angry" (e.g., or other qualitative and/or quantitative description set by the user).

The above description relating to user input of correlations is provided merely as an illustrative example and is not intended to be limiting. As such it is to be understood that the manner in which users may distinctly input one or more correlations and/or correlation rules for biometric characteristic information to mood profiles may be accomplished in other ways and/or by other considerations.

As an illustrative example, in FIG. 2, responsive to reception of the first biometric characteristic information 34, the mood module 22 may be configured to determine a first mood profile 36 for the first user 30. The first mood profile 36 for the first user 30 may characterize the transient emotional state of the first user 30 during participation in the online game at an instance in time and/or over a period of time until additional biometric characteristic information is obtained. The mood module 22 may be configured to, responsive to the biometrics module 20 obtaining second biometric characteristic information 35 from the first client computing platform 28, determine a second mood profile 37 for the first user 30 indicating a change in the transient emotional state of the first user 30.

Returning to FIG. 1, the content adjustment module 24 may be configured to identify game content of the online game to be presented to the users based on the user mood profiles. The content adjustment module 24 may be configured to effectuate presentation of the identified game content of the online game for the appropriate users at the client computing platforms 28. Game content may be content which is identified in accordance with the mood profiles. Game content may be identified in accordance with one or more of the determined transient emotional state, current sentiment towards participation in the online game, and/or other considerations for content identification. Game content may be considered in a variety of ways. Game content may include one or more sets of game content. Sets of game content may include one or more of, notifications for sending to the users, the difficulty of game opponents (e.g., enemies, bosses, etc.), hints which are presented to the users, virtual items which are available for use, in-game incentive offers, and/or other considerations for game content.

In some implementations, the content adjustment module 24 may be configured such that game content includes notifications for sending to the users in the online game. Notifications may include in-game notifications (e.g., messages sent internal to the online game). Notification may include messages sent external to the online game. A set of game content may include multiple game notifications (for example, about upcoming events, tournaments, etc.). Such game content may be identified by the content adjustment module 24 for presentation to a user if the mood profile for the user indicates the user is 'happy', 'excited', and/or having sentiment being "Likely to continue play". This emotional state may indicate that the user may be more likely to positively response to the multiple notifications (e.g., actually participate in the events, tournaments, match ups, etc. identified in the notifications), therefor an identification of the above noted game content may be made to enhance the user's gameplay experience.

In some implementations, a set of game content may include few (e.g., 1 or 2) or no game notifications (for example, about upcoming events, tournaments, etc.). Such game content may be identified by the content adjustment module 24 for presentation to a user if the mood profile for the user indicates the user is 'sad', 'angry', 'frustrated', and/or having sentiment being "Not likely to continue play". This emotional state may indicate that the user may be more likely to positively respond if only a few notifications are sent (e.g., sending many notifications may further anger and/or frustrate the user, therefor no or few notifications may be sent). Therefor an identification of the above noted game content may be made to enhance the user's gameplay experience.

In some implementations, the content adjustment module 24 may be configured such that game content includes the difficulty of defeating enemies in the online game. A set of game content may include enemies which are less difficult to defeat. Such game content may be identified by the content adjustment module 24 for presentation to a user if the mood profile for the users indicates the user is 'sad', 'angry', 'frustrated', and/or having sentiment being "Not likely to continue play". Identification of the given set of game content may be made to enhance the user's gameplay experience such that by subsequently presenting enemies which are easier to defeat, the user may advance through the game with less difficulty, building the user's confidence and potentially affecting their emotional state to change to a more positive one (and be more inclined to continue participation in the online game).

In some implementations, a set of game content may include enemies which are more difficult to defeat. Such game content may be identified by the content adjustment module 24 for presentation to a user if the mood profile for the users indicates the user is 'happy', 'excited', and/or having sentiment being "Likely to continue play". Identification of the above noted set of game content may enhance the user's gameplay experience such that by subsequently presenting enemies which are more difficult to defeat, the user may be presented with more of a challenge, and given the emotional state of the user, may be a welcomed challenge.

In some implementations, the content adjustment module 24 may be configured such that game content includes game hints which are presented to the users in the online game. A set of game content may include few or no hints (for example the quickest way to defeat an enemy). Such game content may be identified by the content adjustment module 24 for presentation to a user if the mood profile for the user indicates the user is 'happy', 'excited', and/or having sentiment being "Likely to continue play". Identification of the given set of game content may enhance the user's gameplay experience such that by subsequently presenting few or no hints, the user may be presented with more of a challenge, and given the emotional state of the user, may be a welcomed challenge.

In some implementations, a set of game content may include multiple hints (for example the quickest way to defeat an enemy). Such game content may be identified by the content adjustment module 24 for presentation to a user if the mood profile for the user indicates the user is 'sad', 'angry', 'frustrated', and/or having sentiment being "Not likely to continue play". Identification of the given set of game content may enhance the user's gameplay experience such that by subsequently presenting multiple hints, the gameplay may become a little easier (even if only temporarily), and given the user's emotional state, may enhance their gameplay experience and may change the users emotional state to a more positive one.

In some implementations, the content adjustment module 24 may be configured such that game content includes virtual items which are made available for use in the online game. A set of game content may include one or more virtual items available for use in the online game (for example a mystery item which may help the user during gameplay). Such game content may be identified by the content adjustment module 24 for presentation to a user if the mood profile for the user indicates the user is 'happy', 'excited', and/or having sentiment being "Likely to continue play". Such identification for the given set of game content may enhance the user's gameplay experience such that the one or more mystery items further excite the user and enhance their gameplay experience. Other virtual items may be considered.

In some implementations, a set of game content may include one or more specific virtual items (e.g., a specific virtual sword that can help the user defeat a specific enemy). Such game content may be identified by the content adjustment module 24 for presentation to a user if the mood profile for the user indicates the user is 'sad', 'angry', 'frustrated', and/or having sentiment being "Not likely to continue play" (e.g., the user feeling this way as a result of being unable to defeat a specific enemy, or other consideration). Identification of the given set of game content may enhance the user's gameplay experience such that by subsequently making a specific virtual item available which may help the user defeat a particular enemy (e.g., or complete a particular level, etc.), the gameplay may become a little easier (even if only temporarily).

The above examples of content identification are provided merely for illustrative purposes and are not intended to be limiting. As such the manner in which content is identified based on user mood profiles may be carried out in different way and/or by other considerations. For example, for users who are 'happy' and/or 'Likely to continue play', game content may be identified for presentation which makes the game easier (e.g., as opposed to more challenging as described above), to thereby enhance the users gameplay experience. For users who are 'sad' and/or "Not likely to continue play', game content may be identified for presentation which reduces the amount of content presented to the users, since the user may be less likely to positively respond to additional content.

As an illustrative example, in FIG. 2, identifications made by the content adjustment module 24 may include identifying a first set of game content 38 based on the first mood profile 36 for the first user 30. The content adjustment module 24 may be configured such that presentation of the first set of game content 38 to the first user is effectuated 40. In some implementations, responsive to determining the second mood profile 37, a second set of game content 39 may be identified by the content adjustment module 24 and effectuated 41 for presentation to the first user 30 in the online game.

In some implementations, the content adjustment module 24 may be configured such that the first set of game content 38 comprises a notification for sending to the first user 30 of the online game.

In some implementations, the content adjustment module 24 may be configured such that the first set of game content 38 comprises a decreased difficulty of defeating an enemy in the online game.

In some implementations, the content adjustment module 24 may be configured such that the first set of game content 38 comprises a game hint for presentation to the first user 30 of the online game at the first client computing platform 28.

In some implementations, the content adjustment module 24 may be configured such that the first set of game content 38 comprises one or more virtual items made available for use by the first user 30 of the online game.

In some implementations, the content adjustment module 24 may be configured such that the first set of game content 38 comprises an in-game incentive offer for the first user 30 of the online game.

Returning to FIG. 1, the server 12, client computing platforms 28, and/or external resources 32 may be operatively linked via one or more electronic communication links. For example, such electronic communication links may be established, at least in part, via a network 26 such as the Internet and/or other networks. It will be appreciated that this is not intended to be limiting, and that the scope of this disclosure includes implementations in which servers 12, client computing platforms 28, and/or external resources 32 may be operatively linked via some other communication media.

The external resources 32 may include sources of information, hosts and/or providers of virtual environments outside of system 10, external entities participating with system 10, external entities for player-to-player communications, and/or other resources. In some implementations, some or all of the functionality attributed herein to external resources 32 may be provided by resources included in system 10.

The server 12 may include electronic storage 25, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

The client computing platforms 28 may include electronic storage 50, one or more processors, and/or other components (see FIG. 2). The client computing platforms 28 may include communication lines, or ports to enable the exchange of information with a network and/or other computing platforms. Illustration of client computing platforms 28 in FIG. 1 and FIG. 2 are not intended to be limiting. The client computing platforms 28 may include a plurality of hardware, software, and/or firmware components operating together to provide the functionality attributed herein to client computing platforms 28.

Electronic storage 25 may comprise electronic storage media that electronically stores information. The electronic storage media of electronic storage 25 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 25 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 25 may include one or more virtual storage resources (e.g., cloud storage, a virtual private network, and/or other virtual storage resources). Electronic storage 25 may store software algorithms, information determined by processor 14, information received from server 12, information received from client computing platforms 28, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 24. Processor 14 may be configured to execute modules 16, 18, 20, 22, 24 by software; hardware; firmware; some combination of software, hardware, and/or firmware; and/or other mechanisms for configuring processing capabilities on processor 14.

It should be appreciated that although modules 16, 18, 20, 22, 24 are illustrated in FIG. 1 as being co-located within a single processing unit, in implementations in which processor 14 includes multiple processing units, one or more of modules 16, 18, 20, 22, 24 may be located remotely from the other modules. The description of the functionality provided by the different modules 16, 18, 20, 22, 24 described above is for illustrative purposes, and is not intended to be limiting, as any of modules 16, 18, 20, 22, 24 may provide more or less functionality than is described. For example, one or more of modules 16, 18, 20, 22, 24 may be eliminated, and some or all of its functionality may be provided by other ones of modules 16, 18, 20, 22, and/or 24, and/or other modules. As another example, processor 14 may be configured to execute one or more additional modules that may perform some or all of the functionality attributed below to one of modules 16, 18, 20, 22, 24.

Figure 3:
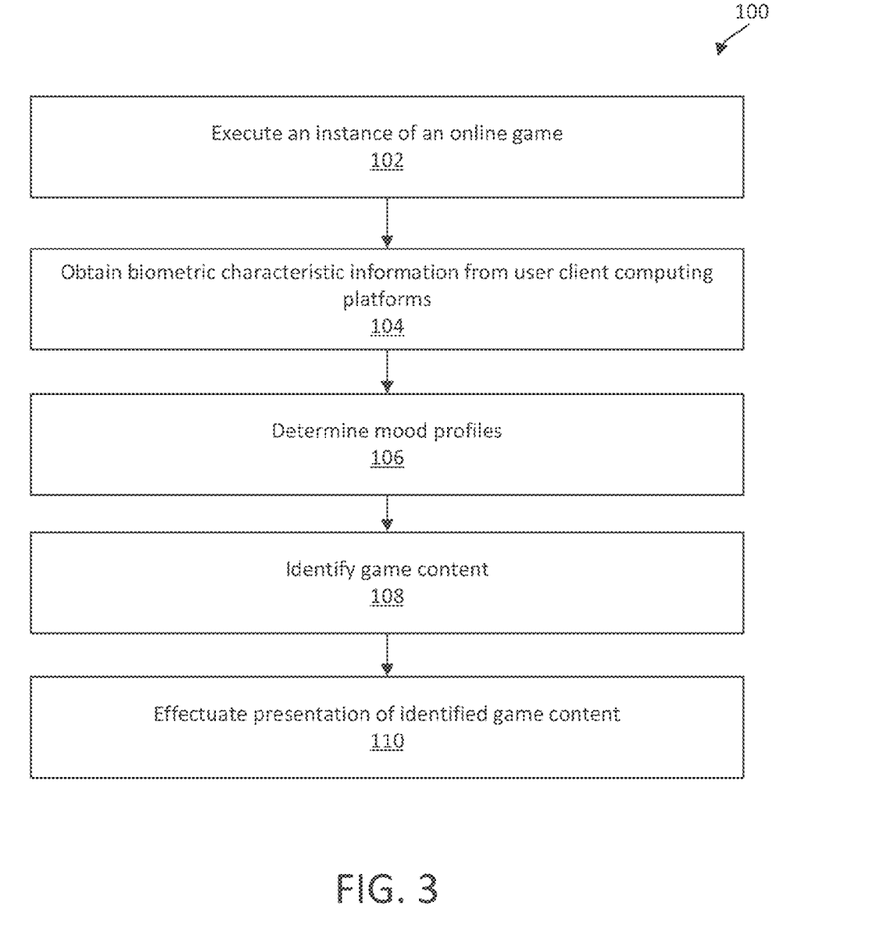
FIG. 3 illustrates a method for using biometric characteristic information about users to adjust content of an online game.

FIG. 3 illustrates method 100 for adjusting game content in an online game. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 an instance of an online game may be executed for presentation to users at client computing devices. The online game may facilitate participation of the users in the online game. In some implementations, operation 102 may be performed by a game module the same as or similar to game module 16 (shown in FIG. 1 and described herein).

At an operation 104, biometric characteristic information may be obtained from the client computing platforms. Biometric characteristic information may include first biometric characteristic information for the first user obtained from the first client computing platform. In some implementations, operation 104 may be performed by a biometrics module the same as or similar to the biometrics module 20 (shown in FIG. 1 and described herein).

At an operation 106, mood profiles may be determined. Mood profiles may be determined based on the biometric characteristic information. Responsive to obtaining the first biometric characteristic information, first mood profile for the first user may be determined. In some implementations, operation 106 may be performed by a mood module the same as or similar to the mood module 22 (shown in FIG. 1 and described herein).

At an operation 108, game content may be identified based on the mood profiles. For example, identifying a first set of game content based on the first mood profile for the first user may be performed. In some implementations, operation 108 may be performed by a content adjustment module the same as or similar to the content adjustment module 24 (shown in FIG. 1 and described herein).

At an operation 110, the identified game content may be effectuated for presentation at the client computing platforms. For example presentation of the first set of game content to the first user may be effectuated at the first client computing platform. In some implementations, operation 110 may be performed by a content adjustment module the same or similar to the content adjustment module 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system for dynamically adjusting game content in an online game, the system comprising:

one or more biometric scanning components configured to obtain biometric characteristic information; and one or more processors configured by machine-readable instructions to:

execute an instance of an online game, and to use the instance to generate state information that is transmitted over a network to client computing platforms associated with users, wherein the transmission of the state information over the network facilitations presentation of views of the online game to the users and to implement the instance of the online game to facilitate participation of the users in the online game via the client computing platforms, the users including a first user participating in the online game via a first client computing platform;

obtain biometric characteristic information from the one or more biometrics scanning components, and/or the user client computing platforms integrated to the one or more biometrics scanning components and/or able to communicate with the one or more biometrics scanning components, such biometric characteristic information including first biometric characteristic information for the first user obtained from the first client computing platform;

determine, from the biometric characteristic information obtained, mood profiles for the users such that, responsive to obtaining the first biometric characteristic information, a first mood profile is determined for the first user;

identify game content of the online game to be presented to the users based on the user mood profiles, such identifications including identifying a first set of game content based on the first mood profile for the first user, wherein the game content includes virtual items which are made available for use in the online game, such that the first set of game content comprises one or more virtual items usable by the first user in the online game; and effectuate presentation of the identified game content of the online game for the appropriate users of the online game, wherein effectuating presentation of the identified game content for the appropriate users includes effectuating presentation of in-game incentive offers for the users of the online game to make purchases of the virtual items included in the identified game content, such that the first set of game content comprises an in-game incentive offer for the first user of the online game to make a purchase of the one or more virtual items included in the first set of game content.

2. The system of claim 1 wherein the one or more processors are further configured by machine-readable instructions such that mood profiles characterize a transient emotional state of the users during participation in the online game, such that the first mood profile for the first user characterizes the transient emotional state of the first user during participation in the online game.

3. The system of claim 1 wherein the one or more processors are further configured by machine-readable instructions to, responsive to obtaining further biometric characteristic information, determine additional mood profiles of the users indicating a change in the transient emotional state of the users, including, responsive to obtaining second biometric characteristic information from the first client computing platform, the one or more processors are further configured by machine-readable instructions to determine a second mood profile for the first user indicating a change in the emotional state of the first user.

4. The system of claim 1 wherein the one or more processors are further configured by machine-readable instructions to maintain a database of determined correlations of biometric characteristic information to mood profiles for the users.

5. The system of claim 4 wherein the one or more processors are further configured by machine-readable instructions such that maintaining correlations of biometric characteristic information to mood profiles comprises receiving user input of the correlations of biometric characteristic information to mood profiles.

6. The system of claim 1 wherein the one or more processors are further configured by machine-readable instructions such that game content includes the difficulty of defeating enemies in the online game, such that the first set of game content comprises a decreased difficulty of defeating an enemy in the online game.

7. The system of claim 1 wherein the one or more processors are further configured by machine-readable instructions such that game content includes game hints presented to the users of the online game, such that the first set of game content comprises a game hint for presentation to the first user of the online game.

8. The system of claim 1 wherein the one or more processors are further configured by machine-readable instructions such that virtual items include mystery boxes.

9. The system of claim 1 wherein the one or more processors are further configured by machine-readable instructions such that game content includes notifications for sending to the users of the online game, such that the first set of game content comprises one or more notifications for sending to the first user of the online game.

10. The system of claim 9 wherein the one or more processors are further configured by machine-readable instructions such that notifications include in-game notifications.

11. The system of claim 1 wherein the biometric characteristic information obtained by the one or more biometrics scanning components includes one or more of a facial scan, a retina scan, a blood oxygen saturation measurement, or a skin moisture measurement of the individual users at the client computing platforms.

12. The system of claim 1 wherein the biometric scanning component includes one or more of a camera, a retinal scanner, a pulse oximeter, a fingerprint scanner, a moisture sensor, a gyroscope, an accelerometer, a compass, a global positioning system, and/or an assisted global positioning system.

13. A method for dynamically adjusting game content in an online game, the method being implemented in a computer system that includes one or more biometric scanning components and one or more physical processors and storage media storing machine-readable instructions, the method comprising:

effectuating an instance of an online game, and using the instance to generate state information that is transmitted over a network to client computing platforms associated with users, wherein the transmission of the state information over the network facilitations presentation of views of the online game to the users, and implementing the instance of the online game to facilitate participation of the users in the online game via the client computing platforms, the users including a first user participating in the online game via a first client computing platform;

obtaining biometric characteristic information from the one or more biometrics scanning components, and/or the user client computing platforms integrated to the one or more biometrics scanning components and/or able to communicate with the one or more biometrics scanning components, such biometric characteristic information including first biometric characteristic information for the first user obtained from the first client computing platform;

determining, from the biometric characteristic information, mood profiles for the users such that, responsive to obtaining the first biometric characteristic information, determining a first mood profile for the first user;

identifying game content of the online game to be presented to the users based on the user mood profiles, including identifying a first set of game content based on the first mood profile for the first user, wherein the game content includes virtual items which are made available for use in the online game, such that the first set of game content comprises one or more virtual items usable by the first user in the online game; and effectuating presentation of the identified game content of the online game for the appropriate users of the online game, wherein effectuating presentation of the identified game content for the appropriate users includes effectuating presentation of in-game incentive offers for the users of the online game to make purchases of the virtual items included in the identified game content, such that the first set of game content comprises an in-game incentive offer for the first user of the online game to make a purchase of the one or more virtual items included in the first set of game content.

14. The method of claim 13 wherein the mood profiles characterize a transient emotional state of the users during participation in the online game, such that the first mood profile for the first user characterizes the transient emotional state of the first user during participation in the online game.

15. The method of claim 13 further including:
responsive to obtaining further biometric characteristic information, determining additional mood profiles of the users indicating a change in the transient emotional state of the users, including, responsive to obtaining second biometric characteristic information from the first client computing platform, determining a second mood profile for the first user indicating a change in the emotional state of the first user.

16. The method of claim 13 further including:
maintaining a database of determined correlations of biometric characteristic information to mood profiles for the users.

17. The method of claim 16 wherein maintaining correlations of biometric characteristic information to mood profiles comprises receiving user input of the correlations of biometric characteristic information to mood profiles.

18. The method of claim 13 wherein game content includes the difficulty of defeating enemies in the online game, such that the first set of game content comprises a decreased difficulty of defeating an enemy in the online game.

19. The method of claim 13 wherein game content includes game hints presented to the users of the online game, such that the first set of game content comprises a game hint for presentation to the first user of the online game.

20. The method of claim 13 wherein the virtual items include mystery boxes.

21. The method of claim 13 wherein game content includes notifications for sending to the users of the online game, such that the first set of game content comprises a notification for sending to the first user of the online game.

22. The method of claim 21 wherein notifications include in-game notifications.

23. The method of claim 13 wherein the biometric characteristic information obtained by the one or more biometrics scanning components includes one or more of a facial scan, a retina scan, a blood oxygen saturation measurement, or a skin moisture measurement of the individual users at the client computing platforms.

24. The method of claim 13 wherein the biometric scanning component includes one or more of a camera, a retinal scanner, a pulse oximeter, a fingerprint scanner, a moisture sensor, a gyroscope, an accelerometer, a compass, a global positioning system, and/or an assisted global positioning system.

* * * * *